Dec. 23, 1952     J. G. LEE     2,622,688
SPINNER CONSTRUCTION WITH BOUNDARY LAYER CONTROL
Filed Dec. 6, 1949

Inventor
John G. Lee
By Leonard F. Wehlind
Agent

Patented Dec. 23, 1952

2,622,688

UNITED STATES PATENT OFFICE 2,622,688

SPINNER CONSTRUCTION WITH
BOUNDARY LAYER CONTROL

John G. Lee, Farmington, Conn., assignor to
United Aircraft Corporation, East Hartford,
Conn., a corporation of Delaware Application December 6, 1949, Serial No. 131,433

6 Claims. (Cl. 170—135.4)

This invention relates to aircraft propellers and more specifically to an improved spinner construction for variable pitch propellers especially adapted for use in combination with turbo-prop power plants and the like.

It is an object of this invention to provide a propeller spinner which includes means for energizing the boundary layer region of air flowing thereover.

Another object of this invention is to provide a spinner construction in combination with a turbo-jet compressor inlet wherein fluid is centrifugally compressed and ejected along the surface defining the approach to the compressor of the power plant thereby maintaining efficient unseparated flow and ensuring high pressure recovery at the compressor.

A further object of this invention is to provide a spinner construction of the type described, which spinner inducts air from the fluid stream to provide a working fluid which is centrifugally compressed and subsequently ejected into the boundary layer region flowing over the spinner.

Another object of this invention is to provide a spinner of the type disclosed wherein the main airfoil portion of the associated variable pitch blades terminate inboard in juxtaposed relation with the outer spinner surface, which surface comprises a spherical portion adjacent the inboard edge of the main blade portion for maintaining said juxtaposed relation in the varied pitched positions of the blades.

Figure 1:
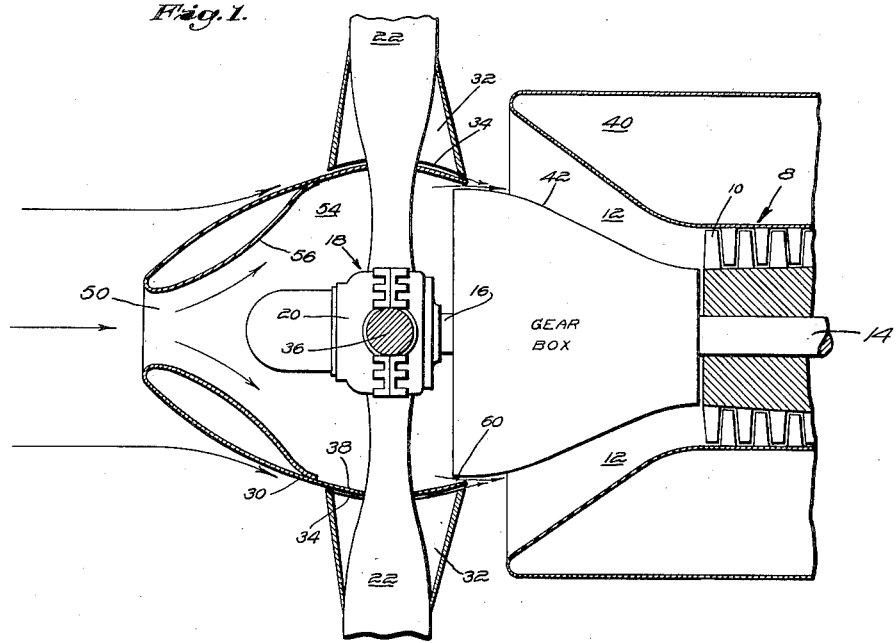

These and other objects of this invention will become readily apparent from the following detailed description of the accompanying drawing in which, Fig. 1 is a partial cross-sectional view of a propeller having a spinner according to this invention and illustrating a compressor inlet adjacent thereto.

Figure 2:
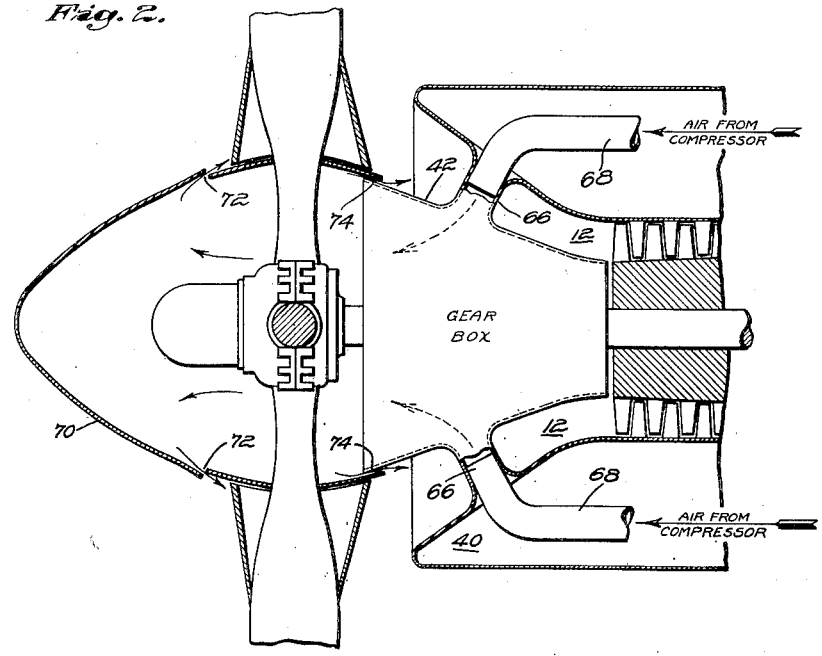

Fig. 2 is a partial cross-sectional view similar to Fig. 1 showing a variation of the Fig. 1 mechanism.

Referring to Fig. 1, a compressor 8 is shown as being located in air inlet 12 and is driven by a turbine type power plant, omitted herein for convenience of illustration. The compressor rotor 10 is driven by a shaft 14 which shaft may also be used through suitable gearing to drive a propeller shaft 16. The propeller shaft 16 in turn drives a propeller 18 which comprises a hub 20 and a plurality of radially extending blades 22. A propeller spinner 30 surrounds the hub 20 to form a streamlined enclosure therefore, and to guide the oncoming airstream around the latter and into the air inlet 12. Each of the blades 22 have fixed thereto a cuff 32 adjacent the root end thereof. Each of the cuffs 32 terminate at their inboard end in a substantially curved chordwise edge 34 which has a substantially constant radius of curvature about a center 36 which is located along the axis of propeller rotation. The spinner 39, on the other hand, has an enlarged portion 38 adjacent the inboard edge 34 of the cuff 32 and likewise, this portion 38 has a radius of curvature similar to that of the cuff edge 34. The enlarged portion 38 also has a substantial identical radius of curvature in a plane transversely of the axis of rotation so that a spherical surface is provided in this vicinity whereby continued substantially sealing relation is maintained between the edge 34 of the cuff 32 and the enlarged portion 38 of the spinner 30 in the varied pitch positions of the propeller blade. As a result, during variations of pitch of the propeller blades, the flow of air over the spinner will remain smooth and undisturbed since no gap will occur between the aforementioned juxtaposed members.

In a turbo-prop installation of the type illustrated wherein the air entrance 12 is defined by an inlet cowl 40 and a central fairing 42, the fairing 42 will be of a much smaller diameter than the bulbous portion of the spinner. In other words, in order to define an inlet of proper dimension, especially at the immediate approach to the compressor rotor 10, the fairing 42 will converge very rapidly thereby subjecting the latter to fluid separation and causing turbulent or non-uniform flow in the inlet 12.

To this end, a ram-air inlet 50 is provided centrally of the forward end of the spinner 30 wherein a portion of the free stream can be inducted into the chamber 54 defined by the spinner 30. A diverging or diffuser type surface 56 is provided internally of the spinner 30 so that during propeller rotation the air inducted through the ram inlet 50 will be increased in pressure and ejected via the annular slot 60 adjacent the aft end of the spinner 30. The hub structure and the blades extending therefrom will whirl the air entering the spinner to provide additional compression by centrifugal force. The high pressure air which is emitted via the slot 60 by its ejector action, continues to draw off boundary layer air from the outer spinner surface forward of the slot, while at the same time the compressed air forceably energizes the boundary layer fluid downstream along the outer surface of the fairing 42. As a result, by controlling the boundary layer fluid in this manner, fluid separation is eliminated to the extent that uniform and smooth flow is continuously maintained within the air entrance 12. It is to be understood that the fairing 42 may be fixed relative to the spinner or may be formed as a continuation of the spinner so as to be integral therewith.

Where it is desirable to have the fairing 42 fixed against rotation a configuration of the type illustrated in Fig. 2 may be utilized. Herein the fairing 42 may be fixed to the adjacent compressor inlet cowl 40 by means of a plurality of streamlined struts 66, one or more of which may be hollow so as to receive air under pressure from a pressure line or lines 68. The pressure source may consist of a tap from the compressor outlet or from some other convenient source.

In the construction shown in Fig. 2, then, the air under pressure will flow into the spinner 70 (which in this configuration contains no upstream inlet) from whence it will be forcibly ejected from the annular slots 72 and 74 along the outer surface of the spinner and downstream along the fairing 42. The slot 72 may be segmental so that boundary layer energization is provided only adjacent the juncture of the propeller blade and the spinner rather than completely circumferentially of the spinner outer surface.

The air under pressure entering the spinner 70 will, of course, have its pressure augmented by the centrifugal pumping action within the rotating spinner.

It is also to be understood that the propeller blade cuffs 32 may be eliminated if hollow type propeller blades are utilized, since in such a construction the outer airfoil covering of the hollow propeller blade may be constructed to terminate adjacent the spinner in much the same manner as illustrated.

As a result of this invention, it is readily apparent that a highly efficient spinner construction has been provided which is adaptable to a wide range of operating conditions for turboprop engines while further being adaptable to a variety of other power plants.

Although certain embodiments of this invention have been illustrated and described herein, it will be apparent that various changes and modifications may be made in the arrangement and construction of the component parts without departing from the scope of this novel concept.

What it is desired by Letters Patent is:

1. In a propeller installation for a turbo-prop power plant having a compressor therefor, a spinner for said propeller including an aft streamlined portion cooperating therewith to form a streamlined continuation thereof, an entrance for the compressor cooperating with said aft portion to form an annular passage leading to the compressor, and means forming a part of said spinner providing high pressure recovery adjacent said compressor including means for energizing the boundary layer region flowing downstream over said spinner, said energizing means comprising means for inducting air from the airstream and into said spinner, compressor means internally of said spinner for compressing said inducted air, and passage means providing fluid communication between said compressor means and the external surface of said aft streamlined portion.

2. A propeller installation comprising a hub and variable pitch propeller blades each including a core and a cuff of airfoil shape surrounding said core, said cuff having its inboard end radially spaced from said hub, in combination with, an air entrance coaxially disposed with said propeller, a spinner for said propeller forming a streamlined closure for said hub and having an enlarged portion thereof between said hub and the inboard end of said cuff, said enlarged spinner portion including a spherical outer surface in juxtaposed relation with the entire inboard ends of each of said cuffs in the varied pitch positions of said propeller, a converging fairing forming a downstream continuation of said spinner outer surface and terminating within said entrance, and means forming a part of said spinner for imparting stabilized unseparated flow past said enlarged portion and along said fairing comprising a compressor in said spinner receiving air from the airstream and discharging compressed air over said fairing adjacent said enlarged portion.

3. In a propeller installation comprising a hub and a spinner surrounding said hub, variable pitch propeller blades extending radially from the hub through said spinner, each blade including a shank portion and an enlarged main portion of airfoil shape, said main portion terminating at its inboard extremity in a substantially curved edge in juxtaposed position with the outer surface of said spinner, means providing continued juxtaposed relationship between said edge and said spinner in the varied pitch positions of said blade for providing stabilized flow over said spinner and through said blades including a spherical surface of revolution forming a part of said spinner and positioned adjacent said edge, the combination of an air inlet downstream of said propeller, means for providing increased pressure recovery within said inlet comprising mechanism for energizing the boundary layer region of said stabilized air passing over said spinner aft of said blades, said mechanism including a ram inlet adjacent the forward end of said spinner, an annular slot in said spinner located downstream of said ram inlet and communicating with the outer surface of said spinner, and means internally of said spinner forming a pump for compressing the air inducted through said ram inlet and ejecting it through said slot.

4. In a propeller installation comprising, a propeller hub, a plurality of variable pitch blades radially extending from said hub each including a shank and enlarged main portion of airfoil shape, an air inlet aft of the propeller, the combination of an elongated spinner surrounding said hub, a fairing forming a downstream continuation of said spinner and terminating within said inlet, said spinner having a contour subject to flow separation at high flow velocities, and means for maintaining high pressure recovery in said inlet and smooth unseparated flow of the air passing over said spinner and said fairing including ejector mechanism for controlling the boundary layer region over said spinner, said ejector mechanism consisting of intake means for admitting a portion of the free airstream into said spinner, a radially diverging chamber in said spinner coaxially disposed about the axis of propeller rotation and communicating with said intake means for compressing the admitted air during propeller rotation, and a passageway downstream of said intake means for drawing off boundary layer air adjacent the forward portion of said spinner and energizing the boundary layer over said fairing comprising an annular slot around the periphery of said spinner positioned aft of said blades for discharging said compressed air in a downstream direction.

5. In a propeller installation comprising a hub and variable pitch propeller blades extending radially therefrom, each of said blades including a shank portion and an enlarged portion of airfoil shape terminating at its inboard end in a curved edge, the combination of an annular air inlet downstream of and coaxial with said spinner including an outer confining cowling and a central tapering body, said body having its larger dimension terminating in a upstream lip adjacent the trailing edge of said spinner, means in continued juxtaposed relation with the inboard edge of said enlarged blade portion comprising a spinner portion having a substantially spherical surface adjacent said edge, means forming a part of said spinner for inducting ram air centrally of said spinner including a diverging confining surface internally of said spinner composing a compressor, said hub and blade shanks forming a centrifugal compressor to additionally compress the air in said spinner during propeller rotation, and means for controlling boundary layer air over said spinner and central body comprising an annular opening defined by the downstream edge of said spinner and the upstream edge of said body for directing the air compressed in said spinner over said body.

6. In a propeller installation for a power plant, a hub having a plurality of blades radiating therefrom, an air inlet downstream of said hub comprising radially spaced inner and outer walls forming an annular passage, and a spinner surrounding said hub and forming an upstream continuation of said inner wall, said spinner comprising an opening in the leading edge of the spinner, a diverging passage within the spinner communicating with said opening for compressing the air inducted through said opening and a passage formed between the trailing edge of said spinner and the upstream end of said inner wall for ejecting compressed air from said diverging passage over said inner wall.

JOHN G. LEE.

REFERENCES CITED

The following references are of record in the file of this patent:

UNITED STATES PATENTS

| Number | Name | Date |
|---|---|---|
| 1,945,071 | Popp | Jan. 30, 1934 |
| 2,150,143 | Adams | Mar. 14, 1939 |
| 2,318,233 | Keller | May 4, 1943 |
| 2,482,720 | Sammons | Sept. 20, 1949 |

FOREIGN PATENTS

| Number | Country | Date |
|---|---|---|
| 102,209 | Sweden | July 29, 1941 |
| 869,753 | France | Nov. 17, 1941 |

OTHER REFERENCES

Ser. No. 326,141, Ramshorn (A. P. C.), published May 11, 1943.